L. F. ADT.
SPECTACLES.
APPLICATION FILED MAY 13, 1910.
975,195.
Patented Nov. 8, 1910.
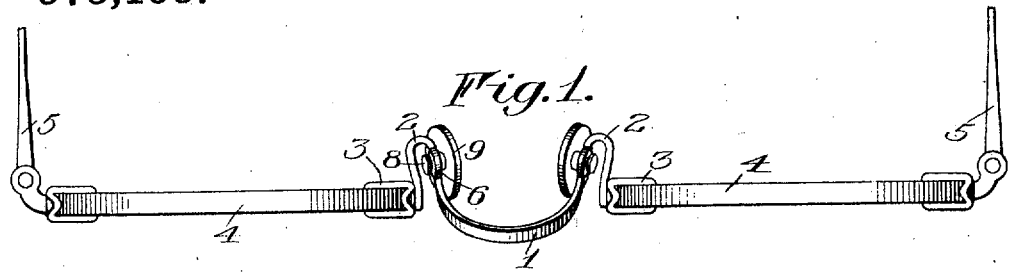
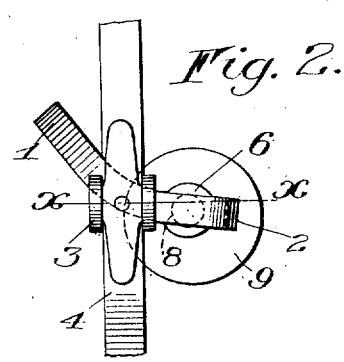
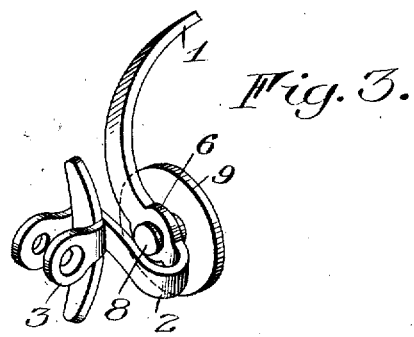
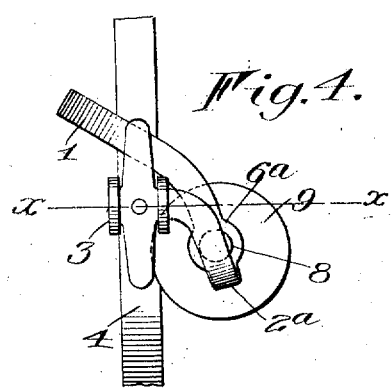
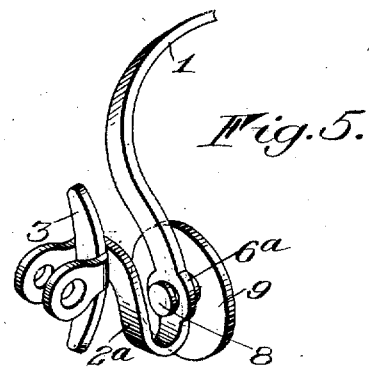
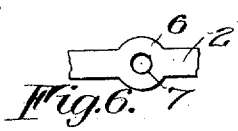
Witnesses
Walter B. Payne
H. W. Simms
Inventor
Leo F. Adt
By Churchs Rich
his Attorneys

UNITED STATES PATENT OFFICE.

LEO F. ADT, OF ALBANY, NEW YORK.

SPECTACLES.

975,195.

Specification of Letters Patent. Patented Nov. 8, 1910.

Application filed May 13, 1910. Serial No. 561,170.

*To all whom it may concern:*

Be it known that I, LEO F. ADT, of Albany, in the county of Albany and State of New York, have invented certain new and useful Improvements in Spectacles; and I do hereby declare the following to be a full, clear, and exact description of the same, reference being had to the accompanying drawings, forming a part of this specification, and to the reference-numerals marked thereon.

The present invention relates to spectacles of the type having rests for engaging the nose of a wearer in such a manner that the weight of the spectacles is removed from the fleshy portion of the nose between the eyes, an object of the invention being to provide a novel construction which will adapt itself automatically to the forward and the upward taper of the nose of the wearer.

To these and other ends the invention consists in certain improvements and combinations of parts all as will be hereinafter more fully described, the novel features being pointed out in the claims at the end of the specification.

In the drawings: Figure 1 is a top view of a mounting constructed in accordance with the present improvements; Fig. 2 is a side view of the same construction with one of the lenses removed; Fig. 3 is a perspective view of the mounting in proximity to one of the nose rests; Fig. 4 is a view similar to Fig. 2 of another embodiment of the invention; Fig. 5 is a view similar to Fig. 3 of the embodiment shown in Fig. 4, and Figs. 6 and 7 are detail views showing different ways in which the metal strip is expanded to form the eyes with which the nose rests engage.

In the embodiment of the invention illustrated in Figs. 1 to 3, the mounting is formed of a single strip of metal of substantially uniform width bent to form an arched or bridging portion 1 inclined to the plane of the lenses to conform to the nose of the wearer and pliable portions 2 embodying in this instance forwardly extending arms providing forwardly opening loops and soldered or otherwise secured to the lens attaching devices 3 at their forward ends, thus permitting the lenses 4 to be set forward or rearward and inward or outward relatively to the bridging portion to accommodate the mounting to the facial characteristics of different wearers. To the outer edges of the lenses 4 temples 5 of any suitable construction may be secured.

In order to provide a universally rocking pad which will conform to the forward and the upward taper of the nose of the wearer and at the same time be so located as to bear upon the bony portion of the nose below the centers of the eyes, the strip of metal of which the bridging portions 2 are formed is provided with expanded portions 6 perforated at 7 to receive pins or projections 8 carried in this instance centrally by the nose rests 9 and preferably rigid with the latter, the nose rests preferably being in the form of circular disks. The points about which the nose rests 9 rock are so located that at least one half of each rest is located below the horizontal plane $x$, $x$ which is the plane of the axes of the lenses of the spectacles and the forward edges of the nose rests preferably project into the plane of the lenses. The relative position of the parts is important for it permits the rests to bear against the bony portion of the nose below the centers of the eyes and not against the reduced or fleshy portion directly between the eyes.

The arched or bridging portion of the mounting being non-resilient or substantially rigid, the nose rests or guards are maintained relatively fixed distances apart and do not pinch the nose unless by such a light wedging action as may result from their mere weight. The universal movement which they are permitted enables them to tilt either vertically or horizontally or both to accommodate themselves to the surface of the wearer's nose and maintain an even and firm bearing thereon without liability of cutting the flesh while the temples serve to retain the spectacles in position.

In order to throw the rest 9 farther down upon the nose the expanded portions 6ª may be extended downwardly from the extremities of the bridging portion, as in Figs. 4 and 5, the pliable portions 2ª each connecting with the expanded portion directly opposite the extremities of the bridging portion forming an upwardly opening loop, extending upwardly and being connected to a lens attaching device 3.

In Figs. 1 to 5 the perforated portions are provided by expanding the metal equally on opposite sides of the strip so that the expanded portions lie in a line between the bridging portion and the pliable portions but it is possible to work the metal in such a manner that the expanded portion extends from one side only of the strip as in Fig. 7. This arrangement has particular advantage when it is desired to drop the nose rests below the plane x, x of the optical axes of the lenses without dropping the forwardly opening pliable loops.

From the foregoing it will be seen that universally rocking nose rests have been attached to what is termed by the trade as a "saddle bridge" at such positions that the rests bear upon the bony part of the nose and this without the provision of parts which would render the mounting conspicuous and at the same time without adding materially to the cost of manufacture of the mounting.

I claim as my invention:

1. In a spectacle mounting, the combination with lens attaching devices; of the following parts made from a strip of non resilient material of substantially uniform width, a bridging portion inclined to the plane of the lenses and pliable portions connecting the bridging portion and the lens attaching devices, the strip of material being provided with eyes in proximity to the extremities of the bridging portion; and nose rests having portions loosely engaging in the eyes.

2. In a spectacle mounting, the combination with lens attaching devices, of a single strip of non resilient material of substantially uniform width connecting them and embodying a pair of expanded perforated portions, a bridging portion between the perforated portions and pliable portions beyond the perforated portions, and nose rests having portions loosely engaging in the perforated portions.

3. In a spectacle mounting, the combination with a bridging portion of non resilient material inclined to the plane of the lenses, lens attaching devices, and pliable portions connecting the bridging portion and the lens attaching devices, of perforated portions arranged between and in line with the bridging portions and the pliable portions, and nose rests having portions loosely engaging in the perforations.

4. In spectacles the combination of the lenses, a rigid bridge connecting them and nose engaging supporting pads loosely mounted on the bridge in fixed spaced relation but permitted a universal rocking movement thereon to conform to the forward and upward taper of the wearer's nose and temples connected to the lenses.

5. In spectacles the combination of the lenses, a rigid bridge connecting them and nose engaging supporting pads loosely mounted on the bridge in fixed spaced relation but permitted a universal rocking movement to conform to the forward and upward taper of the wearer's nose, said bridge having pliable portions connected to the lenses outwardly beyond the pads and temples connected to the lenses.

6. In a spectacle mounting, the combination with a non resilient bridging portion, lens attaching devices and pliable portions connecting the latter with the bridging portion and embodying forwardly extending arms, of universally rocking nose rests supported between the pliable portions and having at least one half of their nose engaging surfaces located below the horizontal plane of the axes of the lenses and portions of their nose engaging surfaces located in the plane of the lenses.

7. In a spectacle mounting, the combination with a non resilient bridging portion inclined to the plane of the lenses to conform to the nose of the wearer, lens attaching devices and pliable portions between the latter and the bridging portion, nose rests, and means connecting the latter to the mounting between the pliable portions, said means having provision permitting universal rocking movement of the rests relatively to the bridging portion about points below the plane of the optical axes of the lenses.

8. In a spectacle mounting, the combination with a non resilient bridging portion inclined to the plane of the lenses to conform to the nose of the wearer, lens attaching devices and pliable portions connecting the lens attaching devices and the bridging portion, of portions between the pliable portions provided with eyes below the plane of the optical axes of the lenses, and nose rests carrying pins loosely engaging in said eyes.

9. In a spectacle mounting, the combination with a non resilient bridging portion, lens attaching devices, and pliable portions connecting the lens attaching devices with the bridging portion, of downwardly extending portions connecting with the mounting between the pliable portions and near the extremities of the bridging portion, nose rests, means connecting the rests with the downward extensions and permitting universal rocking movement of the rests.

10. In a spectacle mounting, the combination with a bridging portion, lens attaching devices, and pliable portions connecting the lens attaching devices with the bridging portion, of portions depending from the mounting between the pliable portions and provided with eyes, and nose rests having portions loosely engaging in the eyes.

LEO F. ADT.

Witnesses:
L. B. CLEXTON,
ISABEL KELLEY.